3,174,828
SORPTION OF BROMINE ON ANION EXCHANGE RESINS IN THE PRESENCE OF EXCESS CHLORINE
Rowland Frank Hein, Wilmington, Del., assignor to E. I. du Pont de Nemours and Company, Wilmington, Del., a corporation of Delaware
No Drawing. Filed Aug. 31, 1960, Ser. No. 53,028
10 Claims. (Cl. 23—216)

This invention is directed to the adsorption of bromine on strong base anion exchange resins; and, in particular, to the recovery of bromine from industrially important brines. According to the present invention, the bromine is more completely recovered by effecting its adsorption in the presence of chlorine. One important aspect of the invention is that bromine may be recovered from sea water by acidifying the solution and oxidizing the bromide content thereof with excess chlorine, followed by contacting the acidified and oxidized brine with a strong base anion exchange resin (to adsorb the bromine in the form of a poly-bromohalide), and then removing the bromine from the resin by appropriate means.

Bromine has been recovered commercially from bromide-containing brines by processes involving acidification and chlorination of the brine followed by steaming or blowing in a current of air to strip the bromine from the solution. In practice, a brine such as sea water (containing about 65 p.p.m. Br as bromide) is brought to pH 3–4 and $Cl_2$ added in accord with the equation (1) $\quad Cl_2 + 2Br^- = Br_2 + 2Cl^-$ up to about 15% excess over the theoretical amount of $Cl_2$ being used. By blowing with air, bromine can be removed in yields of 90% or more.

It has also been shown that bromine forms complexes with quaternary ammonium halides and that strong base anion exchange resins, which contain quaternary ammonium groups as the fixed cationic sites and chloride or bromide ions as the anionic sites, adsorb bromine from aqueous solution, holding the bromine in the form of complex poly-bromohalide anions.

When it is attempted to recover bromine from a dilute bromide source solution such as sea water (where there is present a larger amount of chloride ion), the brine being acidified and chlorinated as for the conventional steaming or blowing process, the adsorption of bromine by the resin is incomplete and the yields are low; as much as about ⅓ of the bromine remains in solution unadsorbed.

It is, therefore, an object of the present invention to provide a novel and significantly efficient process for adsorbing bromine on an anion exchange resin. A further object of this invention is to materially improve the efficiency of this novel adsorption process and to obtain significantly increased yields of bromine. Another object is to provide a practical and efficient novel process for the anion exchange adsorption recovery of bromine from dilute bromine solutions, such as industrially important brines, particularly sea water.

A still further object of this invention is to provide a novel co-current contact process whereby bromine is adsorbed from dilute solutions on strong base anion exchange resins with recovery equal to or better than those obtainable by the conventional bed process, additional significant features being that less expenditure of energy is achieved together with significantly less fouling of the resin by foreign solid matter of the solution treated.

These and other objects will become apparent in the following description and claims.

For ion exchange, column (or bed) operation is generally considered more efficient than a batchwise operation. In bed operation, the ion-exchanger is continuously contacting fresh, i.e., ion-rich solution, whereas in the batch method all the resin is in contact with all the solution being treated and thus is in equilibrium with the ion-depleted solution. Because of the countercurrent contact it provides, bed operation should be particularly suited for treating dilute solutions. Bed operation, however, entails many difficulties on a commercial scale. Most notable are: The need for careful adjustment of the bed and uniform distribution of the solution onto the surface of and through the bed; the development of pressure drops through the bed; and the need for backwashing (bed cleansing) facilities. These become magnified when dilute raw solutions are processed because of the large volumes that pass through the relatively small volume of exchanger and the fact that raw waters contain significant amounts of solid matter. Non-uniform distribution of the influent solution over the bed may lead to premature breakthroughs and excessive leakage, which means decreased exchange capacity. The bed's resistance to the flow of solution (pressure drop) must be overcome by expenditure of energy, i.e., with pumps. Solid matter from the solution building up on the bed as a clogging dense mat has to be periodically removed by shutting down and backwashing. Thus in bed operations, costs of installation, operation, and maintenance tend to be rather high, the more so the more dilute and raw the solution to be treated.

More specifically, the present invention is directed to a novel process for adsorbing bromine from aqueous acidic chloride brine on a strong base anion exchange resin wherein said adsorption is effected in the presence of chlorine.

The heretofore-described novel process provides for more efficient recovery of bromine. The yield of bromine is increased to the extent that chlorine is also present along with the bromine in the solution to be treated. Normally the chlorine will amount to at least about 0.2 mole per mole of bromine and usually not more than about 2 moles per mole of bromine. Preferably, the ratio will be at least about 0.5 to 1 and in particular about 1 to 1. In other words, in the embodiment of the invention wherein bromine is recovered from a bromide-containing chloride brine such as sea water or the like, the amount of chlorine used as oxidant will normally correspond to from 1.2 to 3 atoms (theories) of chlorine per bromide ion, which corresponds to an excess of 0.2 to 2 theories of chlorine over the stoichiometric amount required by the equation, $Cl_2+2Br^-=Br_2+2Cl^-$. Larger excesses of chlorine may be used but are unnecessary. It should be understood that the chlorine referred to herein as being present along with bromine in the solution is the calculated excess over the stoichiometric oxidizing amount of the above equation. An important feature of the present invention is the recovery of excess chlorine, which can be recovered about equally with the bromine when up to 100% excess oxidant $Cl_2$ is used.

The bromine source solution may be a natural or synthetic brine. Natural brines contain bromine as bromide ranging from about 50 to 1000 p.p.m. but may have as high as 6000–7000 p.p.m. These brines have high chloride contents, with the ratio of chloride to bromide ranging broadly from about 20:1 to about 500:1, usually at least 100:1.

It is believed the excess chlorine is required in the present invention because of the rather large amounts of chloride ion normally present in the bromide containing brines. It appears that, when such brine is chlorinated with the stoichiometric amount of chlorine required by the Equation 1, $Cl_2+2Br^-=Br_2+2Cl^-$, bromine chloride (BrCl) is also formed (in addition to $Br_2$) in substantial amounts, leaving corresponding amounts of the original bromine content in the bromide ion, i.e., relatively unadsorbable, form. The formation of BrCl may be represented by the reverse of this Equation 1 and by either of the equilibria, (2) $$Br_2 + Cl_2 = 2BrCl$$

or (3) $$Br_2 + Cl^- = BrCl + Br^-$$

In the air blowing process of recovering bromine from the acidified and chlorinated brine, the presence of BrCl in the solution is relatively unimportant apparently because $Br_2$ is preferentially volatilized, with the result that the equilibria represented by (1), (2) and (3) are displaced in the direction of bromine at the expense of bromine chloride and bromide ion. Thus even with about the stoichiometric amount of chlorine practically quantitative bromine recovery can be achieved in an efficient stripping apparatus. However, in the adsorption process, the resin apparently removes both $Br_2$ and BrCl and at similar rates (surprisingly); also, it appears to hold the chlorine tightly such that the reverse reaction does not occur and the adsorbed chlorine is not available for oxidizing residual $Br^-$ to $Br_2$ as in Equation 1.

The bromine source solution for the present invention may also be a synthetic bromide-containing brine or an aqueous bromine-containing waste brine stream. As in the natural brines the ratio of chloride ion to bromine (as Br) may vary widely, may be as low as 20 to 1, or as high as, say 500 to 1. The chloride may be any chloride which is soluble in and dissociates in water to the extent of furnishing chloride ions in the desired amounts and ratios. Suitable brine-forming soluble and dissociating chlorides are hydrogen chloride, the alkali metal (Li, Na, K, Br, Cs) and the alkaline earth metal (Mg, Ca, Sr, Ba) salts, and mixtures thereof. Bromine source solutions wherein the bromine is in the bromide form are put in the proper form for adsorption by oxidation of the bromide to bromine. Chlorine is the preferred oxidant. As indicated by the Equation 1 above, the moles of chlorine as oxidant should be at least equal to the moles of bromine it is desired to recover. However, according to the invention, the chlorine oxidant will be used in excess as defined.

Solutions of the halogens in water are normally acidic. For the purpose of the invention the pH of the aqueous phase in contact with the resin will be less than 7, and preferably below 5, and in particular in the range 3–4. Where needed, a sufficiently strong acid such as hydrochloric, hydrobromic, sulfuric, phosphoric, nitric, trifluoroacetic, and the like can be added to achieve and maintain the desired pH level. pH's below 2–3 appear unnecessary.

Suitable and available strong base anion exchange resins are of the quaternary ammonium type. They are essentially long chain-like and web-like water-insoluble molecules characterized by having quaternary ammonium groups as the fixed, i.e., non-exchangeable cationic sites. Associated with these sites are anions (which make the resin electrically neutral and which are the exchangeable constituents) that may be varied as desired by proper treatment as is well known in the art. Typical resins are based on the polystyrene backbone; divinylbenzene cross-linking units provide the necessary degree of dimensional stability and water-insolubility to the polymer, while groups of the formula, $$-alkylene-\overset{+}{N}R_1R_2R_3$$

provide the positively charged sites. $R_1$, $R_2$ and $R_3$ are usually alkyl such as methyl, ethyl and the like, but may be alkylol such as hydroxyethyl, and may be joined to constitute along with the nitrogen atom a heterocyclic radical such as methyl-piperidinium or pyridinium. Resins such as these may be prepared by chloromethylating a polystyrene-divinylbenzene copolymer, then reacting with the appropriate tertiary amine.

Specific resins that may be employed in the present invention are set forth in U.S. Patent 2,591,573. Other quaternary ammonium type resins that may be employed are disclosed in U.S. Patents 2,630,427 and 2,597,494 and in U.S. Patent 2,597,440. A specific representative example is the strong base anion exchange resin prepared according to the examples (A-B-C) of U.S. 2,591,573. The hydroxide form of this resin is converted to the chloride form, for example, by flowing sea water through it. Also, it is understood that commercially available Amberlite IRA 400 listed in the following table is of the class of strong base anion exchange resins described in U.S. Patent 2,591,573. In the present process, satisfactory results are obtained with the resins of the patent and with the commercial articles Amberlite IRA 400. The resins described in U.S. Patent 2,900,352 can also be used; for example, the resin prepared according to Example 5 of this patent. Also the resins described broadly and as specifically shown in Example 2 in U.S. 2,614,099 may also be used in this process.

Many suitable resins are available commercially as given below. The Type I resins are understood to have $$-C_6H_4CH_2-\overset{+}{N}(CH_3)_3$$

groups, the Type II resins to contain $$-C_6H_4-CH_2-\overset{+}{N}(CH_3)_2CH_2CH_2OH$$

groups, and the pyridine type to be based on pyridine as the source of the cationic sites:

STRONG BASE ANION EXCHANGE RESINS

| Commercial Name | Source | Quaternary Ammonium Type |
|---|---|---|
| Duolite A-101 | Chemical Process Co. of Redwood City, California. | I. |
| Duolite A-101 | | I. |
| Retardion 11A8 | | I. |
| Dowex 2 | Dow Chemical Co. of Midland Michigan. | II. |
| Dowex 21K | | I. |
| Dowex 1 | | I. |
| Dowex 11 | | I. |
| Amberlite IRA 400 | Rohm and Haas Co. of Phila., Pa. | I. |
| Amberlite IRA 401 | | I. |
| Amberlite IRA 402 | | I. |
| Amberlite IRA 410 | | II. |
| Amberlite IRA 411 | | II. |
| Permutit S-1 | The Permutit Co. of New York, New York. | I. |
| Permutit SK | | Pyridine. |

The resins utilized according to the present novel process are normally obtained as granules or uniform beads, usually in the hydroxide or chloride form and in particle sizes of from about 16 to 400 mesh. The chloride form is more commonly available; however, any form of the resin may be employed, so long as the anionic component is exchangeable by chloride and bromide ions. In addition to the chloride and hydroxide forms, the acetate, nitrate, bisulfate and sulfate, phosphate, fluoride, and the like forms may be used. Treating any of the above with bromine in sodium chloride brine, for example, results in the anions of the resin being displaced by a bromine-containing polyhalide ion as more fully discussed below. Mixtures of the above resins may be used in practicing this invention.

In the bromine adsorption process, a substantial portion of the halogen taken up by the resin has the character of molecular or positive halogen. This halogen is held by the resin's cationic sites in complex form believed to be monovalent anions of the formula $Br_nX_m^-$, where X is Br or Cl and $n$ and $m$ are small whole numbers whose sum is odd, e.g., $Br_2Cl^-$, $BrCl_2^-$, $Br_3^-$, $Br_4Cl^-$, $Br_5^-$, $BrCl_4^-$, and the like, depending on the relative amounts of bromine and chlorine used. Bromine in this form is capable of oxidizing substances which are known reducing agents for molecular bromine and also of introducing bromo groups into many organic compounds reactive towards bromine.

The present invention is adapted to countercurrent (e.g., fixed bed) and cocurrent (batch type) operations which may be carried out in conventional ion exchange equipment at ordinary temperatures and pressures. The temperature may range upwards from just above the freezing point of the solution to be treated, but is preferably kept below about 60° C. to minimize halogen attack on the resin itself.

The novel process of this invention is particularly adaptable to the recovery of bromine from dilute brines such as the industrially important chloride brines that contain from about 50 to 1000 p.p.m. bromine as bromide ion, and will be described below with particular reference to sea water as the bromine source solution. To illustrate, sea water, which normally has 65 p.p.m. bromine as bromide and 18,980 p.p.m. chloride is pumped from the sea, is allowed to settle in a basin and passed through screens to remove sediment and other debris. It is then acidified with an acid such as hydrochloric or sulfuric acid or mixtures thereof to a pH of less than 5, preferably between 3 and 4. Chlorine is then fed in, in excess of the amount equivalent to the bromide content, preferably in 50 to 100% excess. The presence of chlorine, results in a lowering of the pH somewhat. The amount introduced can be determined and monitored by calibrating the system in terms of the oxidation potential developed between platinum and calomel electrodes. The solution is now ready for the adsorption step.

CONVENTIONAL BED PROCESS

The acidified and chlorinated sea water is allowed to percolate through a bed of resin granules supported in a column. Flow rates of 20–80 gallons per minute per cubic foot of bed are convenient for 20–100 mesh resins at a bed depth of about 0.5 to 2 feet. Preferred are relatively porous 20–50 mesh resins used at a bed depth of about one foot and flow rates of 30–40 g.p.m./cu.ft. The flow may be continued until "breakthrough" reached. A typical resin containing

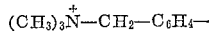

$(CH_3)_3\overset{+}{N}-CH_2-C_6H_4-$ sites holds, on the average, about 3–5 lbs. of bromine per cubic foot at equilibrium with the sea water. The amount of bromine held by the resin at equilibrium increases with increasing amounts of added chlorine and with decreasing pH. Usually the resin is loaded to about ½ its capacity, to minimize leakage. The resin may then be backwashed with water, e.g., sea water to remove fine dirt. Bromine-rich resin is normally orange under these conditions, in contrast to the original chloride form which is colorless to light brown.

By use of excess chlorine according to the invention, significantly more efficient use of resin and equipment and higher yields of bromine are achieved relative to the use of about the stoichiometric amount of the chlorine oxidant. Smaller volumes of sea water need be processed for the same degree of loading. In a given time, higher bromine loadings are reached and a larger percentage of the bromine content of the influent solution removed. Another advantage is that the resin is found to contain the excess chlorine which is recoverable as useful hydrochloric acid as discussed below.

Alternatively, the acidified and chlorinated sea water can be cocurrently contacted with resin to obtain the results underlying the invention.

COCURRENT CONTACT

Normally from about 0.5–10 volumes of resin, preferably 2–5 volumes, is mixed with 1000 volumes of the bromine source solution and the mixture held for the desired length of time before the bromine-laden resin is separated from the water phase. Broadly the seawater (or any bromide brine as herein described), the acidifying acid, the chlorine oxidant for bromide, and the resin can be added separately or together in any order.

Conveniently the resin is handled as a slurry in sea water which can be pumped into a mixing zone where, for example, it is mixed with separate streams of acidified sea water and chlorine. The latter as gas can be blown into the suspension of resin-sea water to effect mixing as well as to oxidize bromide to bromine and to provide excess chlorine according to the invention. In a typical embodiment, the resin and the acidified and chlorinated sea water are continuously moved along a channel (canal, ditch, trough, or pipe), then separated continuously as by screening. The channel can be pitched such that the resin-water phase mixture flows under gravity to the separation zone. The resin can be moved along mechanically by mixing and conveying means, with a screw conveyor for example, or carried by the flow of the water phase.

Suitable resin transport can be obtained by adjusting the dimensions of the channel and the flow of the water phase along it. While agitation is not necessary for operability it may be desirable as a means of keeping the resin granules suspended in and moving along with the bromine source solution to the separation zone. Duration of contact varies, depending on such factors as resin particle size and porosity, but ordinarily is of the order of 5–15 minutes with 100–200 mesh sizes of the available commercial resins and 10–30 minutes with the 20–50 mesh resins.

The velocity of flow in the channel may be made sufficient in itself to prevent settling of the solids before reaching the separation zone. For example with 50–100 mesh resin in a straight channel a velocity of 2–10 feet/sec. will ordinarily maintain the resin suspended. At lower velocities auxiliary agitation may be required. When relatively small volumes of solution are being handled in the channel, it may be appropriate to use auxiliary agitation means, whatever the velocity, to reduce pumping costs.

The resin is recovered from the water phase by settling, decanting, screening, or filtering, according to known principles and techniques. For example, the resin-water suspension may first be thickened by flowing past a coarse screen arranged such that the water phase passes through under a hydraulic head, leaving a relatively concentrated slurry of resin which then requires a smaller filter or settling chamber for final separation.

The thus treated and separated water phase from any of the above operations may still contain positive bromine values—though generally this will be less than 20 p.p.m. Br—and if desired may again be treated according to the method of the invention. For example, the water phase from the co-current process can be treated with another batch of resin, and the resin recovered from this second stage can be used as such to remove bromine from a fresh supply of acidified and chlorinated sea water.

Over-all, the total power input for moving the resin water phase along the channel to the separation zone and for effecting separation is a small fraction of the power needed to lift the same volume of water solution to an adequately sized column of the same resin and to overcome the pressure drop through the bed. Also, the recoveries of bromine by the present cocurrent method are as good or better than by the bed process, reaching 85–95% of theoretical in less time at less expenditure of energy.

As in the bed process, the excess chlorine and the chloride ion of the chloride brines exemplified by sea water cooperate to effect substantial improvements in the efficiencies of the adsorption process, as illustrated in the representative examples.

RECOVERY OF ADSORBED HALOGEN

The bromine and the chlorine adsorbed along with it is conveniently recovered from the resin by reduction to bromide and chloride and removal as a concentrated aqueous phase. The recovery of excess oxidant chlorine as hydrochloric acid is an important feature of the invention. When a mole of chlorine is present along with each mole of bromine in the adsorption process, as when 100% excess $Cl_2$ is used as oxidant for sea water, the chlorine is adsorbed in about equal proportion with the bromine. Reduction of the adsorbed bromine and chlorine with aqueous sulfur dioxide produces a mixture of hydrochloric, hydrobromic and sulfuric acids, in accordance with the equation, (4) $\quad X_2 + SO_2 + 2H_2O = 2HX + H_2SO_4$ where $X_2$ = bromine, chlorine or mixtures or interhalogen compounds thereof.

The bromine value of this relatively concentrated acid solution obtained in accordance with Equation 4 is readily recovered by reoxidation with chlorine (one theory) and stripping by known means. Over-all, for each $2Br^-$ in sea water which is converted to and eventually recovered as $Br_2$ according to this exemplification of the invention, there are used 3 moles $Cl_2$ and 2 moles $SO_2$. Of the $3Cl_2$ molecules, 2 are recovered as $4HCl$; the $2SO_2$ molecules are recovered as 4 equivalents of acid i.e., as $2H_2SO_4$. The combined 8 equivalents of recovered acid is used to acidify the incoming sea water.

Normally the strong base anion exchange resins, as prepared by the known methods and obtained commercially, are in part reactive towards free bromine and chlorine, and at first irreversibly consume some of this halogen in undergoing substitution or addition reactions. To obtain consistent adsorption results it may be necessary to condition the resin by pretreatment with bromine or chlorine or both, in effect to "burn away" (or halogenate) labile (or reactive) sites and produce a resin providing consistently high yields of recoverable bromine by the adsorption process. Conveniently the resin, say the commercial product in suitable, e.g., chloride form, is subjected to the over-all cycle of being contacted with the bromine source solution in final form, e.g., acidified and chlorinated sea water, to adsorb bromine, then treated with a reducing agent, e.g. $SO_2$ in the presence of water to reduce and remove bromine, then washed with brine to complete the elution step. The cycle is repeated until reproducible results are obtained in terms of bromine recoveries. In Examples 1-3 below illustrating the invention resin is employed which had been through at least 29 cycles. Occasional washing with an organic solvent, e.g., acetone helps keep the resin clean of water-insoluble but solvent-soluble organic matter that may contribute to clogging of the resin pores.

Representative examples illustrating the present invention are as follows.

EXAMPLE 1

Sea water containing 65 p.p.m. Br is adjusted to pH 3 to 3.5 by mixing with a pre-mix made of 4.2 parts 37% HCl, 5.8 parts conc. $H_2SO_4$ and 102 parts sea water. Chlorine is added as a saturated sea water solution in an amount required to provide the degree of chlorination indicated below. The adjustment of the acidity and chlorination levels is automatically controlled by mixing valves. The addition of acid is actuated via a glass calomel pH electrode monitoring the sea water stream. Similarly, a calibrated EMF cell containing platinum and calomel electrodes monitors the chlorine content by signaling a control mechanism governing the $Cl_2$ feed. The amount of oxidant halogen in the feed is checked periodically by sampling and known methods of chemical analysis.

The acidified and chlorinated sea water is then fed at a constant rate of 39 gal./min./sq. ft. to a 4" diameter glass pipe loaded to a height of 13" with 20-50 mesh strong base anion exchange resin in the chloride form, said resin being prepared according to the example (A-B-C) of U.S. Patent 2,591,573. As prepared resin has a mesh size of 20-50 and a moisture content of 36%; the capacity of this resin for absorbing chloride ion ($Cl^-$) from sodium chloride solution was 1.19 meq./ml. on a wet (36% $H_2O$) basis and was 3.2 meq./g. after drying at 105° C. to a constant weight. This resin is supported in the column on a porous plate of resin bonded coke. The effluent is analyzed periodically for total bromine content (oxidant bromine as well as bromide ion) and as well for total free halogen (total bromine plus oxidant chlorine). The results are tabulated below (Table 1).

To recover the adsorbed halogen, the feed is stopped and the column drained until the top level is about 6" above the top of the bed. Sulfur dioxide gas is then passed in, up through the bottom of the column in a vigorous stream to effect good mixing, to reduce adsorbed oxidant halogen completely. The resultant aqueous phase is drained and reserved, and the column washed with 70 lbs. of saturated aqueous NaCl over a period of 30 minutes (to displace substantially all the bromide) from the resin. The wash is combined with the above aqueous phase and the bromide content determined.

*Table 1*

A. 1.1 EQUIVALENTS OF CHLORINE OXIDANT ORIGINAL INPUT FEED OF BROMINE=61 P.P.M.

[Total bromine in effluent]

| Adsorption Period, min. $t_1$-$t_2$ | P.p.m. at $t_2$ | Percent of total input | Yield of Bromine adsorbed, percent |
|---|---|---|---|
| 0-20 | 22 | 34 | 66 |
| 20-40 | 16.5 | 31.5 | 68.5 |
| 40-60 | 14.5 | 29 | 71 |
| 60-80 | 15.5 | 28 | 72 |
| 80-100 | 18.5 | 28.5 | 71.5 |
| 100-120 | 22 | 30 | 70 |

B. 2.1 EQUIVALENTS OF CHLORINE OXIDANT ORIGINAL INPUT FEED OF BROMINE=60 P.P.M.

| 0-20 | 1.5 | 2.5 | 97.5 |
|---|---|---|---|
| 20-40 | 1.7 | 2.7 | 97.3 |
| 40-60 | 4 | 4 | 96 |
| 60-80 | 7 | 5.9 | 94.1 |
| 80-100 | 11 | 8.4 | 91.6 |
| 100-120 | 15 | 11.1 | 88.9 |

In run B, illustrating the invention, the resin after 120 minutes had removed an average of 88.9% of the bromine from the input solution and had a bromine loading of 1.6 lbs./cu. ft. of resin. In comparative run A, in the same time, the resin had picked up 70% of the bromine to a loading of 1.2 lbs./cu. ft. of resin.

EXAMPLE 2

4.6 liters of sea water containing 60 p.p.m. Br as bromide ion was brough to pH 4.5 with 25% $H_2SO_4$. Chlorine was added in amounts corresponding to the stoichiometric equivalents tabulated below, one equivalent being the amount required to oxidize bromide per the equation $$Cl_2 + 2Br^- = Br_2 + 2Cl^-$$

A small sample was removed and titrated for total bromine ($Br_2 + Br^-$) and for total oxidizing halogen ($Br_2 + Cl_2$) and calculated as bromine. 20 ml. of the 20-50 mesh resin of Example 1 was added. Periodically a sample of the aqueous phase was removed and analyzed for total bromine and total free halogen as before.

The results are summarized in the following chart in terms of bromine remaining in the treated sea water at the specified times. The data tabulated in Table 2 which follows shows the equilibrium concentrations.

Table 2

EQUILIBRIUM ADSORPTION OF BROMINE-CHLORINE

| Theories $Cl_2$ | Total Bromine Remaining, p.p.m. | Total Free Halogen Remaining, (p.p.m. as Br) |
|---|---|---|
| 1.06 | 22 | 3.5 |
| 1.35 | 13 | 4.7 |
| 1.75 | 7.4 | 6.2 |
| 1.9 | 3.8 | 5.3 |
| 3.0 | 2.6 | 14 |

The results show that percentagewise less bromine and chlorine remain in solution, conversely more bromine and chlorine is adsorbed by the resin, as the amount of oxidant chlorine is increased. Practically all the excess chlorine (up to about 2 theories) is adsorbed by the resin along with the bromine.

| Resin/Sea water, ml./4.6 L. | Bromine Remaining, p.p.m. at Theories Chlorine | | | |
|---|---|---|---|---|
| | 1.06 | 1.35 | 1.75 | 1.9 |
| 5 | | 22 | 21 | 18 |
| 10 | | 16 | 12 | 10 |
| 20 [1] | 22 | 13 | 7.4 | 3.8 |

[1] This set from Example 2.

The results show that at 1.35 to 1.9 theories chlorine only about ¼ the amount of resin is needed to give the degree of loading achieved with 1.06 theory chlorine. Advantages of using smaller resin/water ratios are lower resin costs and easier handling and filtering (for recovery).

EXAMPLE 4

The procedure of Example 2 was repeated with the same resin, but of particle size 100–200 mesh, which

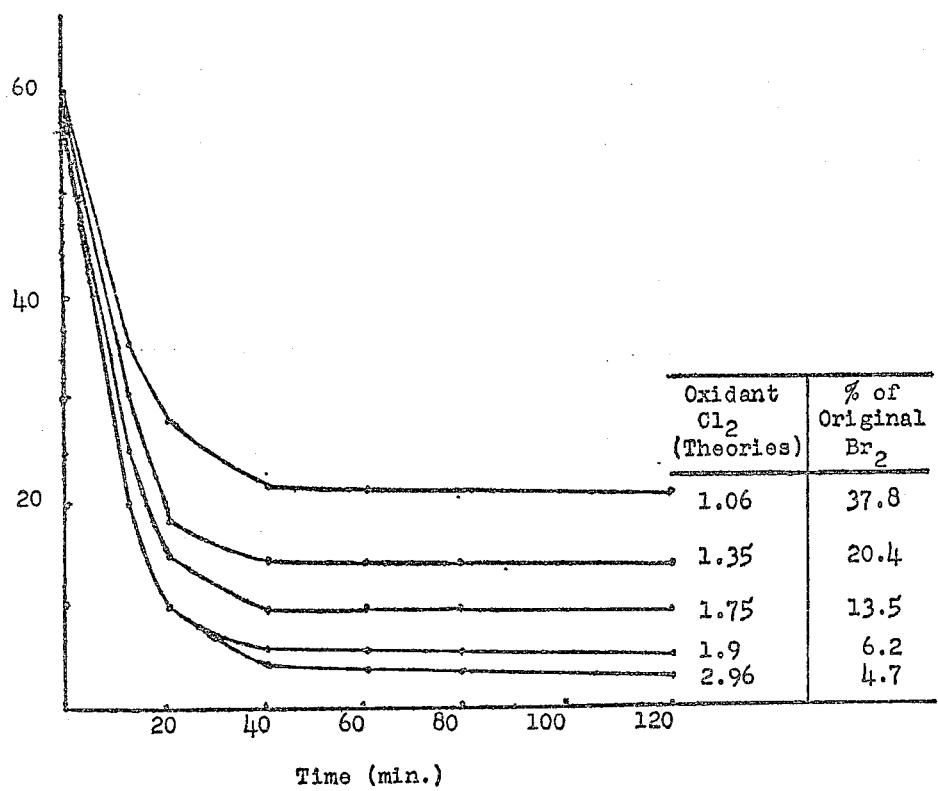

ADSORPTION OF BROMINE FROM SEA WATER ON STRONG BASE ANION EXCHANGE RESIN IN THE PRESENCE OF CHLORINE

The adsorbed halogen (the difference between the starting concentration of bromine and that remaining in solution) can be substantially completely removed from the resin by reduction with aqueous $SO_2$ and then washing with NaCl brine.

EXAMPLE 3

The procedure of Example 2 was repeated at different resin/sea water ratios and at the chlorine levels given below.

had been conditioned by two bromination and recovery cycles. The sea water was acidified to pH 4.5 and chlorinated with 2.1 theories of chlorine. At a resin/sea water ratio of 5 ml./liter equilibrium was attained rapidly: The bromine content of the aqueous phase fell in 3 minutes from 58 p.p.m. to 10 p.p.m., in 5 minutes to 6 p.p.m., and in 10 minutes to 5 p.p.m. where it remained after 40, 80 and 160 minutes. The unadsorbed total free halogen at equilibrium was 5 p.p.m.

Repeating the above examples at pH 3 gives substantially the same order of results. Also substantially the same relative order to results are obtained using any of the resins referred to earlier by example and also listed in the table of available resins.

Any of the heretofore-described basic anion exchange resins may be substituted in the preceding examples to give substantially the same results. Other practical variations and modifications may, of course, be made by one skilled in the art within the scope of this invention. For example, the chlorine may also be added in the form of a hypochlorite or chlorate (e.g., the alkali metal salts) for the oxidation of bromide to bromine, it being understood that in acid solutions, hypochlorites yield hypochlorous acid which is substantially identical to chlorine water (according to equation $HOCl+HCl=Cl_2+H_2O$) and that chlorates form chloric acid which in turn yields $Cl_2$ according to the equation $$HClO_3+5HCl=3Cl_2+3H_2O$$

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. In the process of adsorbing bromine from an aqueous acidic chloride brine on a strong base anion exchange resin capable of existing in the chloride form, said bromine being determined as $Br_2$, the improvement wherein said adsorption is effected in the presence of from about 0.2 mole to about 2.0 moles of chlorine per mole of said bromine.

2. In the process of adsorbing bromine on an anion exchange resin capable of existing in the chloride form, said process comprising steps of acidifying and chlorinating a bromide-containing chloride brine, the improvement wherein said chlorinating step is carried out with chlorine present in an amount of from 1.2 to 3 atoms of chlorine per bromide ion, followed by contacting the resultant solution with said anion exchange resin.

3. The process of claim 1 wherein said adsorbing is effected in the presence of from 0.5 mole to 1 mole of chlorine per mole of said bromine.

4. The process of claim 2 wherein said chlorinating step is carried out with chlorine present in an amount of from 1.5 to 2 atoms of chlorine per bromide ion.

5. In the process of adsorbing bromine from an aqueous acidic chloride brine on a strong base anion exchange resin capable of existing in the chloride form, the improvement wherein said adsorption is effected in the presence of from about 0.2 mole to about 2.0 moles of chlorine per mole of said bromine, followed by recovering said adsorbed bromine from said resin.

6. In the process of adsorbing bromine on an anion exchange resin capable of existing in the chloride form, said process comprising steps of acidifying and chlorinating a bromide-containing chloride brine, the improvement wherein said chlorinating step is carried out with chlorine present in an amount of from 1.2 to 3 atoms of chlorine per bromide ion, followed by contacting the resultant solution with said anion exchange resin, followed by recovering said adsorbed bromine from said resin.

7. In the process of adsorbing bromine from an aqueous acidic chloride brine on a strong base anion exchange resin, said resin being in the chloride form, the improvement wherein said adsorption is effected in the presence of from about 0.2 mole to about 2.0 moles of chlorine per mole of said bromine.

8. In the process of adsorbing bromine on an anion exchange resin, said resin being in the chloride form said process comprising steps of acidifying and chlorinating a bromide-containing chloride brine, the improvement wherein said chlorinating step is carried out with chlorine present in an amount of from 1.2 to 3 atoms of chlorine per bromide ion, followed by contacting the resultant solution with said anion exchange resin.

9. In the process of adsorbing bromine from an aqueous acidic chloride brine, said brine having from about 50 to 7000 p.p.m. bromide, the pH of said brine being from about 2 to less than 7, on a strong base anion exchange resin capable of existing in the chloride form, the improvement wherein said adsorption is effected in the presence of from about 0.2 mole to about 2.0 moles of chlorine per mole of said bromine.

10. In the process of adsorbing bromine on an anion exchange resin capable of existing in the chloride form, said process comprising steps of acidifying and chlorinating a bromide-containing chloride brine, said brine having from about 50 to 7000 p.p.m. bromide, the pH of said brine being from about 2 to less than 7, the improvement wherein said chlorinating step is carried out with chlorine present in an amount of from 1.2 to 3 atoms of chlorine per bromide ion, followed by contacting the resultant solution with said anion exchange resin.

References Cited in the file of this patent

UNITED STATES PATENTS

| | | |
|---|---|---|
| 1,916,094 | Curtin | June 27, 1933 |
| 1,917,762 | Grebe et al. | July 11, 1933 |
| 2,945,746 | Shaw | July 19, 1960 |

OTHER REFERENCES

Chem. and Industry (London), pp. 1238–9 (1957).